[illegible] [illegible] 2,398,135
CONTROL AND RELAY CIRCUIT
Filed April 6, [illegible]
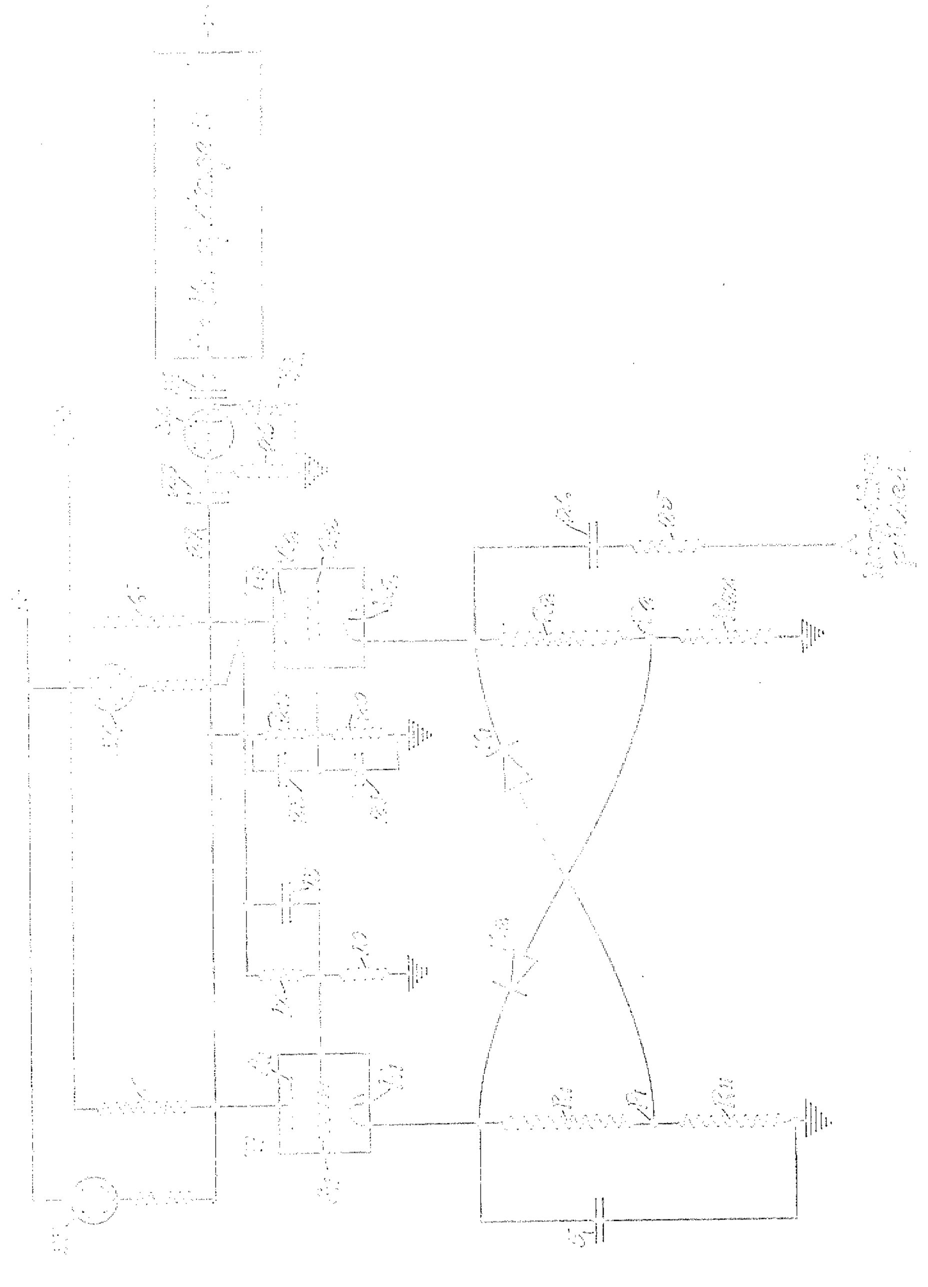
INVENTOR
[illegible]
BY
[illegible]
ATTY.

Patented Apr. 17, 1956 2,333,985

UNITED STATES PATENT OFFICE 2,333,985

COUNTER AND MEMORY CIRCUIT

Richard Weissman, Chicago, Ill.

Application April 5, 1952, Serial No. 280,846

6 Claims. (Cl. 250—27)

This invention relates to a counter and memory circuit, and particularly to a circuit having more than two positions of stable equilibrium per stage. The invention also relates to a ternary counting circuit utilizing the memory circuit.

Memory circuits usually have one or two vacuum tubes or gas tubes per stage and have two positions of stable equilibrium, corresponding to cut-off or maximum current conduction for each tube in a stage. Thus a common type of memory circuit and counting circuit uses a pair of vacuum tubes back-coupled to each other in a manner derived from a multi-vibrator circuit. The tubes are so arranged that they have two positions of stable equilibrium. While such circuits are highly satisfactory, they become complicated when counting is necessary. In particular, a counter, utilizing a number of conventional binary stages, becomes increasingly complex as the counting ability is increased.

In accordance with this invention, there is provided a circuit having more than two positions of stable equilibrium, and particularly three positions of stable equilibrium. Furthermore, in accordance with this invention, a counting system consisting of individual stages of a ternary type becomes possible. Inasmuch as the counting ability increases as a power of the number of stable positions of each stage, it follows that a stage having three positions of stable equilibrium can provide a counting system which is much more compact and can handle much greater numbers than a conventional counting system consisting of the same number of binary counting stages.

The invention forming the subject matter of this application is based upon a stage consisting of two amplifiers cross-coupled to each other in a manner generally resembling the amplifiers forming a multivibrator. In such stages, it is customary for the input and output circuits of each amplifier, of the two amplifiers, to be electrically coupled to each other so that one pair of corresponding electrodes always remain at the same instantaneous potential. Thus customarily, the cathodes of the amplifiers are tied together so that they are always at the same potential. In the circuit embodying the present invention, the amplifiers forming a stage have no input or output electrodes which are tied to each other to be always at the same instantaneous potential as is usual in conventional systems. Instead, the corresponding electrodes, such as cathodes, for example, are coupled to each other through non-linear devices as a result of which new and unusual modes of operation become possible.

Inasmuch as an abstract explanation apart from any drawing or diagram is difficult to understand, the broader and more specific concepts of this invention will now be explained in connection with the drawing wherein an exemplary embodiment of the subject matter of this invention is shown.

In the drawing there is shown one stage in detail and a second stage in block form, connected so that stage one operates the second stage. The two stages are alike so that it will be necessary to describe only one of the stages in detail.

Thus referring to stage one, the stage consists of two vacuum tubes T1 and T2. These tubes are of the three-electrode variety having cathode, control grid and anode but may have more electrodes if desired. Any additional electrodes, such as screen grids, are not properly considered as being in the input or output circuits of a tube. Hence such additional electrodes, if used, may be connected in conventional manners. Thus tube T1 has cathode K1, grid G1 and anode A1. Cathode K1 is connected to ground through resistors R1 and R11 in series. The two resistors have junction point P1. Cathode K1 is connected to grounded condenser 5. Anode A1 is connected through resistor 6 to a suitable source of B plus potential.

Tube T2 has its electrodes similarly connected. Grid G1 is connected to grounded resistor 10 and is also connected to anode A2 by resistor 12. This latter resistor is shunted by condenser 13.

Grid G2 is connected to ground through resistor 20 which is shunted by condenser 21. Grid G2 is also connected to anode A1 by resistor 22 and condenser 23.

The stage so far described is more or less conventional except for the fact that cathodes K1 and K2 have individual resistors. Between point P1 and cathode K2 is connected rectifier X1. Rectifier X2 is similarly connected between cathode K1 and point P2. The polarity of the rectifiers is as indicated, so that conduction will occur respectively when P1 is positive with respect to K2 on the one hand or point P2 is positive with respect to cathode K1.

Negative trigger pulses are supplied through resistor 25 and condenser 26 to cathode K1. The output of the stage is taken from anode A1 by wire 27. This wire supplies both negative and positive pulses to a differentiating circuit consisting of condenser 28 and grounded resistor 29. The differentiated output from condenser 28 is fed to rectifier 30. The rectifier, which may be either of the electron discharge or barrier-layer type is poled so that negative pulses only pass. The rectifier output is connected through blocking condenser 31 and grounded resistor 32 to K2 of the second stage.

Initially, when a stage is energized, it may assume any one of three positions, to be described in detail later. Inasmuch as successive trigger pulses cause a stage to go through a sequence of three positions, it is immaterial which position is initially assumed by a stage. In practice, a stage will be set in the desired initial position by means of an auxiliary switch to connect the two cathodes directly together or by trigger pulses or both.

For convenience, let it be assumed that stage 1 is in the condition where tube T1 is cut off and tube T2 is conducting heavily. In that condition, the potential of cathode K2 will be at its maximum positive value above ground. The potential of point P2 will also have a certain value above ground. Since the potential at cathode K1 normally would tend toward ground because T1 is cut off, current will flow through rectifier X2. Thus the potential of K1 will be above ground but lower than the potential of cathode K2.

Now assume that a negative trigger pulse appears at K2. The potential of K2 drops sharply (a drop will be referred to when the potential becomes more negative and a rise will be referred to when the potential becomes more positive with respect to ground). When the potential of cathode K2 drops, the potential of grid G2 tends to follow the cathode potential downwardly by virtue of the diode action between these two electrodes. Then when the potential of grid G2 drops, the potentials across condensers 23 and 21 becomes different. It will be remembered that while tube T2 was conducting heavily, prior to the trigger pulse, the potential of grid G2 and cathode K2 were substantially equal and both were well above ground. Thus a certain difference of potential existed at this time across condenser 21. When the potential of grid G2 drops sharply and follows the potential of cathode K2, condenser 21 will discharge. Condenser 23 on the other hand, will charge additionally.

By virtue of condensers 21 and 23, the potential of grid G2 will remain negative after the trigger pulse has passed and the potential of K2 rises. Accordingly, tube T2 will begin to cut-off, the potential of anode A2 will start to rise. At the same time, the positive rise in potential at anode A2 will be transmitted to grid G1 and begin to swing this grid positive. The potential at anode A1 begins to drop and, through the coupling to G2, the well-known multi-vibrator action takes place whereby tube T1 conducts heavily and tube T2 is cut-off.

In this first swing where T2 is cut-off and T1 conducts heavily, the cross connections between the cathode resistors aid in completing the swing and reducing degeneration at K1. When T1 is conducting heavily, rectifier X1 will conduct. Now assume that an additional negative trigger pulse is impressed upon cathode K2. At this negative pulse, K2 has its potential dropped sharply. While tube T2 has been cut-off, the potential of grid G2 has assumed a certain value with respect to ground, this depending upon the dividing effects of resistors 22 and 20. This potential of grid G2 is low enough so that the potential of cathode K2 will be above that of grid G2, thus assuring cut-off of T2. The potential of grid G2 remains constant long enough so that grid G2 becomes less negative with respect to cathode K2 for the duration of the pulse and tube T2 begins to conduct. The potential at anode A2 starts to drop and tube T1 begins to cut-off. Thus the potential of cathode K1 also begins to drop. When the potentials of cathode K1 and K2 equal each other, rectifiers X1 and X2 cease to conduct and the cathodes are effectively disconnected. When the cathodes of T1 and T2 are disconnected, the cathode resistors, which are high in value, cause degeneration, particularly in tube T2. In this tube, no condenser shunts the cathode resistors. At this time, the see-saw action tending to cut in tube T1 and cut-off T2 ceases and both tubes are stabilized at a condition of intermediate conduction where both tubes conduct some current.

The reason that the first trigger pulse (when T1 was cut-off) caused both tubes to go through a complete change, and did not stop at an intermediate position, will now be explained. When tube T2 conducts, condenser 21 has a difference of potential impressed across it which is a function of the division of potentials between resistor 22 and the parallel combination of 20 and R2 and R22. The quick discharge of condenser 21 through grid G2 and cathode K2 drops the potential of grid G2 sharply. When the pulse is over, the potential of cathode K2 begins to rise quickly while G2 remains negative. Due to the presence of condensers 23 and 21, G2 remains negative long enough for the action of T1 to cut-off T2 completely. Hence T2 cuts off completely. When the succeeding trigger pulse reaches K2 with T2 cut-off, condenser 21 cannot discharge, at least to any substantial extent through tube T2. Hence tube T2 begins to conduct a little due to the negative pulse. The reaction on tube T1 is as expected in a simple multivibrator up to a certain point. When the potentials of cathodes K1 and K2 are equal the lack of coupling between K1 and K2 causes T1 and T2 to stop reacting upon each other and both tubes conduct slightly. If the trigger pulse duration is excessive, then of course the intermediate tube condition will not be a point of equilibrium.

The pulse duration for triggering to intermediate condition must be shorter than the time constant of the circuit of condenser 21 when tube T2 is cut-off. On the other hand, when T2 conducts heavily, the time constant of the G2 circuit must be shorter than the pulse duration. This is possible because of the diode action between G2 and K2.

At this stabilized intermediate position, the potentials at anodes A1 and A2 are about equal. A succeeding negative pulse at cathode K2 momentarily destroys the condition of intermediate equilibrium and permits tube T2 to conduct more heavily and tube T1 to cut-off. This additional pulse cannot cause tube T2 to cut-off and tube T1 to conduct heavily. In other words, this additional negative trigger pulse cannot cause the stage to step back into the second state or condition where tube T2 is cut-off completely and tube T1 conducts heavily. This is due to the fact that no grid current in T2 can flow to discharge condenser 23 while G2 is negative with respect to K2.

In the intermediate condition where T1 and T2 both conduct slightly, G2 is slightly negative to K2, but above cut-off. Hence a negative pulse on K2 tends to make T2 conduct more heavily.

This causes T[illegible] to cut-off, from slight conduction. This cut-off of T[illegible] is completed by the action of [illegible] which does not allow the potential of [illegible] to fall appreciably below that of [illegible] so that multi-vibrator action between T1 and T2 can occur. Thus [illegible] is full on and T[illegible] is cut-off. Condensers [illegible] and [illegible] hold the potential of G[illegible] down for a long enough time, after condenser [illegible] is charged by the first negative pulse (when T[illegible] conducts heavily and receives the negative pulse). The purpose of condenser [illegible] is to accelerate the transition, thus providing a sharper driving pulse for the next stage. The intermediate tube condition occurs when both grids are at about the same potential and both cathodes are also at the same potential. This can only occur when a trigger pulse of suitable amplitude and duration is applied to the stage with T[illegible] conducting and T[illegible] cut-off.

Some variation of pulse potential and duration is possible. In general, if the pulse potential is multiplied by time, a quantity of pulse energy will result. Within limits, this quantity is variable. Holding the quantity of pulse energy within a range, within limits, the pulse duration and pulse potential may thus be varied.

Indicating means to show the condition of a stage are provided. Thus gas tubes [illegible] and [illegible] are connected in series with individual ballasts between A1 and A2 on the one hand and a potential source on the other hand.

By suitable selection of components, tubes [illegible] and [illegible] will glow or be dark, depending upon circuit conditions. Thus if tube T1 is cut-off, tube [illegible] will be dark. When T[illegible] is conducting heavily, tube [illegible] will glow. When T[illegible] conducts lightly, tube [illegible] will be dark. The same for tube T2. It will be evident that tubes [illegible] and [illegible] will show whether the stage is in one or other extreme condition, depending upon which of the glow discharge tubes is dark. When both such tubes are dark, the stage will be in an intermediate condition.

An example of a system which I have successfully operated will now be given. Tubes T1 and T2 together were a 12AU7 tube. Resistors [illegible] and [illegible] were each 22,000 ohms while R[illegible] and R[illegible] were each 10,000 ohms. Condensers [illegible] and [illegible] were 500 and 50 mmf. respectively. Condensers [illegible] and [illegible] were each 25 mmf. and condenser [illegible] was 30 mmf. Resistor [illegible] was 27,000 ohms. Resistors R1 and R2 were each 2700 ohms.

Condensers [illegible] and [illegible] were each 50 and 200 mmf., while resistor [illegible] was 20,000 ohms and resistor [illegible] was 47,000 ohms.

Rectifiers [illegible] and [illegible] were the two halves of a 6AL5 tube while rectifier [illegible] was an 1N34 germanium diode. Gas discharge tubes [illegible] and [illegible] were NE51 indicator lamps in series with 2.2 megohm ballasts. The B plus potential was 300 volts. The trigger pulses were —100 volts of 1 microsecond duration.

The potentials at A1 for cut-off, intermediate and conducting were respectively 290 volts, 221 volts and 145 volts.

It will be understood that some variations from the above figures will result depending upon tube aging, variations in values of resistors, and the like.

The tolerances for the various components as resistors and condensers are generally the same as in a conventional counter circuit. Thus for example, resistors [illegible] and [illegible] are a corresponding resistor pair and, in general, should be within about 5% of each other. The same applies to resistors [illegible] and [illegible] and for other corresponding resistor pairs in the cathode and anode circuits. Condensers [illegible] and [illegible] are a corresponding pair and should also be within about 5% of each other. Providing that these relationships are maintained, it is possible to vary the values of corresponding resistor pairs over a substantial range. Thus for example, resistors [illegible] and [illegible] should be within about 5% of each other but their values may vary substantially with respect to other resistors.

Resistors [illegible] and [illegible], condenser [illegible] for tube T1 and resistors [illegible] and [illegible] and condenser [illegible] for tube T2 generally act in a manner similar to a conventional counter circuit and are subject to similar design considerations. Thus condensers [illegible] and [illegible] function to speed the change in tube conditions and also impart counting ability and memory characteristics to the circuit. Thus if condensers [illegible], [illegible] and [illegible] were omitted, the circuit, as shown, would have memory characteristics only and remain in any one of three stable positions indefinitely. In such a memory circuit, connecting electrodes G1 and G2 together momentarily would cause a stage to assume an intermediate position where both tubes T1 and T2 conduct moderately. If electrode G1 is grounded momentarily, tube T2 would be cut-off, while T1 would be conducting heavily. Grounding electrode G2 momentarily would reverse the tube conditions.

Disregarding the separation of the tube cathodes and rectifiers, the stage described is, except for condenser [illegible], a conventional multi-vibrator. As is well known, a well designed multi-vibrator can generate square waves with steep sides. Because of the differentiation of a wave-form when it is conducted to a resistive load by means of a condenser, overshoot of a steep side is usually present. This results in the well-known voltage pips at the beginning and end of a square wave. It is well known, however, that the pips may be eliminated by capacitive loading of one or both tubes. This has some tendency to reduce the steepness of the wave sides.

Thus in the system described, condenser [illegible] loads the grid circuit of T2 and anode circuit of T1. The loading could be as well done by having condenser [illegible] between grid G1 and ground or between A1 and A2. These loading expedients are well known. The loading of a stage, therefore, reduces the velocity of change of state so that, at a certain part of a complete cycle, the degeneration effects of the cathode connections can come into play.

Even a symmetrical stage, i. e. one having similar connections for each tube in a stage, is non-symmetrical to an input pulse circuit. Thus if condenser [illegible] is replaced by a condenser connecting the two tube anodes, a symmetrical stage results. But, when T1 is cut-off and T2 conducts heavily, the stage is not the same to an input pulse at K[illegible] as when T1 conducts and T2 is cut-off. Thus one pulse input to a symmetrical or non-symmetrical stage can cause successive different effects. Thus in the system described, the pulse input to a particular cathode will cause that tube to stop at an intermediate condition only when the tube is going from cut-off toward conduction.

Condensers [illegible] and [illegible] generally must have values of at least about 15 mmf. although in some instances a value as low as 10 mmf. may work. The stray and distributed capacitances have effects upon the operation of the system and in some measure will tend to affect the minimum value of condenser capacitances. It is assumed that stray capacitances are more or less similar as regards the two tube circuits of a stage, and on this assumption, the values of condensers 13 and 23 should be within about 5% of each other.

The location of point P1 on the cathode resistors and the values of the cathode resistors will depend upon the amount of tube current to be passed at full tube conduction. In general, the value of a cathode resistor, that is the sum of R1 and R11 for example, will be governed by the same considerations as obtain in a conventional counter circuit. The location of the point for connecting the rectifier is not critical and will be determined by the cut-off characteristics of the vacuum tube used, the characteristics of the rectifier and the desired characteristics of the circuit as a whole, particularly the intermediate current condition. The two cathode circuits, however, should be as much alike as possible within about 5%. Condenser 5, across the cathode resistors in T1, is provided for the purpose of sharpening the pulse in the anode circuit of this tube. This condenser may have a value of about 300 mmf. although this value may vary. If desired, this condenser may be omitted.

The rectifier may consist either of a diode or any other electron discharge device or may be of the crystal type, such as germanium. This latter type of rectifier has a high ratio of back to forward resistance and is well suited for this type of circuit. A selenium rectifier is also satisfactory.

The trigger pulse is preferably sharp and has a duration suitable for operating a stage. As a rule, the trigger pulse requirements will be largely determined by the necessity for reaching and stopping at the intermediate condition. If the pulse is too long or too great in amplitude, there may be instability. However, the circuit, as described, will operate quite satisfactorily over a substantial variation of pulse amplitude and duration from the pulse for which the stage is designed. As is understood, a stage may be designed to accommodate pulses of different duration and amplitude. Precision requirements come into being when high speed operation of a stage is desired.

The trigger injection point has been described as at K2. Trigger pulses of suitable positive amplitude may be applied to G2 or of suitable negative amplitude to A2.

In general it is preferred to apply the pulses to the cathode of tube T2 as distinguished from the cathode of T1. However, the pulse input may be applied to the system generally under the same conditions as is true in a conventional multivibrator.

What is claimed is:

1. A circuit having three conditions of stable equilibrium, said circuit comprising two vacuum tube amplifiers, each amplifier having a cathode, control grid and anode, cross connections between the anodes and control grids, each such cross connection including a resistor, each of said tubes having a resistor between ground and its control grid, resistors between the cathodes of said tubes and ground, each cathode having separate resistors, rectifiers cross-connected between the cathodes and intermediate cathode resistor points and poled so that the direction of conduction is from an intermediate resistor point to a cathode, load resistors in said anode circuit, said circuit when energized having one stable position with one tube conducting heavily and the other tube cut off or another stable position vice versa, or still another stable position with both tubes conducting slightly.

2. A circuit having three conditions of stable equilibrium, said circuit comprising two vacuum tube amplifiers, each amplifier having a cathode, control grid and anode, cross connections between the anodes and control grids, each such cross connection including a condenser and resistor in shunt, each of said tubes having a resistor between ground and its control grid, resistors between the cathodes of said tubes and ground, each cathode having separate resistors, rectifiers cross-connected between the cathodes and intermediate cathode resistor points and poled so that the direction of conduction is from an intermediate resistor point to a cathode, and load resistors in said anode circuit.

3. A circuit having three conditions of stable equilibrium, said circuit comprising two vacuum tube amplifiers, each amplifier having a cathode, control grid and anode, cross connections between the anodes and control grids, each such cross connection including resistor and condenser in shunt therewith, one of said tubes having a condenser and resistor in shunt therewith between ground and its control grid, resistors between the cathodes of said tubes and ground, each cathode having separate resistors, rectifiers cross connected between the cathodes and intermediate cathode resistor points and poled so that the direction of conduction is from an intermediate resistor point to a cathode, load resistors in said anode circuit, and a pulse intake circuit for said one tube, said pulse intake requiring pulses of a polarity tending toward space current through said one tube, said circuit being adapted to have one tube conducting heavily and the other tube cut off, or vice versa, or to have both tubes conducting slightly when said one tube is successively pulsed, the tubes, grid to anode cross connections, grid and cathode resistors being symmetrical, the condensers and resistors for the grid circuit of said one tube having such values that the time constant for such grid circuit when said one tube is cut off, is greater than the pulse duration.

4. A circuit having three conditions of stable equilibrium, said circuit comprising two vacuum tube amplifiers, each amplifier having a cathode, control grid and anode, cross connections between the anodes and control grids, each such cross connection including a resistor and condenser in shunt therewith, said two tubes each having a resistor between ground and the control grid, a condenser in shunt to the grid resistor for only one of said tubes, resistors between the cathodes of said tubes and ground, each cathode having separate resistors, rectifiers cross connected between the cathodes and intermediate cathode resistor points and poled so that the direction of conduction is from an intermediate resistor point to a cathode, load resistors in said anode circuit, and a pulse intake circuit for said one tube only, said pulse intake requiring pulses of a polarity tending to cause conduction through said one tube, the tubes, cross connections, grid and cathode resistors being symmetrical as for a multi-vibrator, the grid to ground resistor and condenser for said one tube having a time constant longer than a pulse duration and of the order of about one-half of the time constant of the grid to anode cross circuit, said circuit being adapted to have one tube conducting heavily and the other tube cut off or vice versa, or to have both tubes conducting slightly.

5. The circuit according to claim 4 wherein a condenser is connected across the cathode resistors of the other tube only and wherein an output to a similar stage is taken from the anode of the other tube.

6. A counter comprising at least two stages, each stage comprising the circuit of claim 4 and a pulse transmission path between the anode of the other tube in stage one to the intake of stage 2.

7. A circuit having three conditions of stable equilibrium, said circuit comprising two vacuum tube amplifiers, each amplifier having a cathode, control grid and anode, cross-connections between the anodes and control grids, each such cross-connection including a condenser and resistor in shunt, each of said tubes having a resistor between ground and its control grid, resistors between the cathodes of said tubes and ground, each cathode having separate resistors, rectifiers cross-connected between the cathodes and intermediate cathode resistor points and poled so that the direction of conduction is from an intermediate resistor point to a cathode, load resistors in said anode circuit, means for loading said circuit so that excessive voltage overshoot upon a change of circuit conditions is substantially eliminated, and pulse input terminals for said circuit, said terminals being located at ground and at one of the tube electrodes, said pulse being of sufficient magnitude and polarity so that successive pulses will cause said circuit to go through successive conditions of stable equilibrium where one tube conducts heavily and another tube is cut-off, the reverse condition and where both tubes conduct moderately.

8. The circuit according to claim 7 wherein the pulse input is at a cathode.

RICHARD WEISSMAN.

No references cited.